United States Patent
Mei et al.

(10) Patent No.: US 10,878,580 B2
(45) Date of Patent: Dec. 29, 2020

(54) POINT CLUSTER REFINEMENT PROCESSING OF IMAGE DATA FOR LIDAR-BASED VEHICLE TRACKING SYSTEM AND METHOD

(71) Applicant: TUSIMPLE, INC., San Diego, CA (US)

(72) Inventors: Xue Mei, Ann Arbor, MI (US); Chenyang Li, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 30 days.

(21) Appl. No.: 16/160,761

(22) Filed: Oct. 15, 2018

(65) Prior Publication Data

US 2020/0118277 A1 Apr. 16, 2020

(51) Int. Cl.

| | |
|---|---|
| *G06T 7/246* | (2017.01) |
| *G06T 7/70* | (2017.01) |
| *G06T 7/11* | (2017.01) |
| *G06T 7/521* | (2017.01) |
| *G01S 17/89* | (2020.01) |
| *G01S 17/86* | (2020.01) |
| *G06T 7/20* | (2017.01) |

(52) U.S. Cl.
CPC .............. *G06T 7/248* (2017.01); *G01S 17/86* (2020.01); *G01S 17/89* (2013.01); *G06T 7/11* (2017.01); *G06T 7/521* (2017.01); *G06T 7/70* (2017.01); *G06T 2207/10028* (2013.01); *G06T 2207/20076* (2013.01); *G06T 2207/20221* (2013.01); *G06T 2207/30252* (2013.01)

(58) Field of Classification Search
CPC . G06T 7/593; G06T 7/60; G06N 3/08; G06N 20/00; H04N 19/103; H04N 19/172; G05D 1/022; G05D 1/0246; G05D 1/0257; G05D 1/0221; G06K 9/6259; G06K 9/6218; G06K 9/6269; G06K 9/6202
USPC .......... 345/4; 340/425.5; 382/103, 255, 156, 382/159
See application file for complete search history.

(56) References Cited

U.S. PATENT DOCUMENTS

| | | |
|---|---|---|
| 9,576,185 B1 | 2/2017 | Delp |
| 2008/0118143 A1 | 5/2008 | Gordon et al. |
| 2010/0074532 A1 | 3/2010 | Gordon et al. |
| 2015/0221079 A1 | 8/2015 | Schultz et al. |
| 2019/0180467 A1 | 6/2019 | Li et al. |
| 2019/0310378 A1 | 10/2019 | Ho |
| 2019/0311546 A1 | 10/2019 | Tay et al. |
| 2020/0026960 A1* | 1/2020 | Park ................ G05D 1/0088 |
| 2020/0117947 A1 | 4/2020 | Mei et al. |

(Continued)

*Primary Examiner* — Phuoc H Doan
(74) *Attorney, Agent, or Firm* — Paul Liu; Perkins Coie, LLP (57) ABSTRACT

A method of LiDAR-based vehicle tracking for a non-transitory computer readable storage medium storing one or more programs is disclosed. The one or more programs include instructions, which when executed by a computing device, cause the computing device to perform the following steps including: calculating the probability of a cluster pair that belongs to a same vehicle using tracking information from a previous frame and spatial information from current frame, determining that the clusters of the cluster pair are merged into one by taking both spatial information and tracking information into consideration, and merging the clusters into a single, complete cluster.

20 Claims, 9 Drawing Sheets

(56) References Cited

U.S. PATENT DOCUMENTS

2020/0118277 A1    4/2020  Mei et al.
2020/0118278 A1    4/2020  Mei et al.

\* cited by examiner

POINT CLUSTER REFINEMENT PROCESSING OF IMAGE DATA FOR LIDAR-BASED VEHICLE TRACKING SYSTEM AND METHOD

PRIORITY/RELATED DOCUMENTS

This patent application incorporates by reference in their entireties these co-pending patent applications filed on Oct. 15, 2018, including the following: U.S. patent application Ser. No. 16/160,749, titled "Segmentation Processing of Image Data for LiDAR-Based Vehicle Tracking System and Method," published as US 2020-0117947 on Apr. 16, 2020, and U.S. patent application Ser. No. 16/160,771, titled "Tracking and Modeling Processing of Image Data for LiDAR-Based Vehicle Tracking System and Method," published as US 2020-0118278 on Apr. 16, 2020, and all with the same inventor(s).

FIELD OF THE DISCLOSURE

The field of the disclosure is in general related to autonomous vehicles and, in particular, to a method and system for light detection and ranging (LiDAR)-based vehicle tracking.

BACKGROUND OF THE DISCLOSURE

Intelligent and autonomous vehicles are promising solutions to enhance road safety, traffic issues and passengers' comfort. Among the complex and challenging tasks of road vehicles is vehicle tracking. Vehicle tracking plays an important role in many driver assistance systems or autonomous vehicles. A vehicle tracking system tracks the position and shape of moving vehicles in the surrounding environment of an ego vehicle, and provides important information for vehicle path planning.

BRIEF SUMMARY OF THE DISCLOSURE

Various objects, features, aspects and advantages of the present embodiment will become more apparent from the following detailed description of embodiments of the embodiment, along with the accompanying drawings in which like numerals represent like components.

Embodiments of the present disclosure provide a method of LiDAR-based vehicle tracking for a non-transitory computer readable storage medium storing one or more programs is disclosed. The one or more programs include instructions, which when executed by a computing device, cause the computing device to perform the following steps including: calculating the probability of a cluster pair that belongs to a same vehicle using tracking information from previous frames and spatial information from current frame, determining that the clusters of the cluster pair are merged into one by taking both spatial information and tracking information into consideration, and merging the clusters into a single, complete cluster.

In an embodiment, calculating the probability of a cluster pair that belongs to a same vehicle further comprises calculating the probability of the cluster pair that belongs to same vehicle by their relative position and shape.

In another embodiment, calculating the probability of a cluster pair that belongs to a same vehicle further comprises calculating the probability of the cluster pair that belongs to the same vehicle by their degree of consistency to the previous tracked vehicle.

In yet another embodiment, before calculating the probability of a cluster pair that belongs to a same vehicle, the method further comprises obtaining information on location of a drivable road based on GPS and a map, and removing clusters not on the drivable road.

In still another embodiment, before calculating the probability of a cluster pair that belongs to a same vehicle, the method further comprises segmenting points in a point cloud into clusters.

In yet still another embodiment, the method further comprises scanning all the cluster pairs, and merging cluster pairs with a higher probability than a predetermined threshold into a single cluster.

Some embodiments of the present disclosure provide a system for LiDAR-based vehicle tracking. The system includes an internet server that comprises: an I/O port, configured to transmit and receive electrical signals to and from a client device; a memory; one or more processing units; and one or more programs stored in the memory and configured for execution by the one or more processing units, the one or more programs including instructions for: calculating the probability of a cluster pair that belongs to a same vehicle using tracking information from previous frames and spatial information from current frame, determining that the clusters of the cluster pair are merged into one by taking both spatial information and tracking information into consideration, and merging the clusters into a single, complete cluster.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Any alterations and modifications in the described embodiments, and any further applications of principles described in this document are contemplated as would normally occur to one of ordinary skill in the art to which the disclosure relates. Specific examples of components and arrangements are described below to simplify the present disclosure. These are, of course, merely examples and are not intended to be limiting. For example, when an element is referred to as being "connected to" or "coupled to" another element, it may be directly connected to or coupled to the other element, or intervening elements may be present.

In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "one embodiment" or "an embodiment" means that a particular feature, structure, or characteristic described in connection with the embodiment is included in at least one embodiment.

In the drawings, the figures are not necessarily drawn to scale, and in some instances the drawings have been exaggerated and/or simplified in places for illustrative purposes. One of ordinary skill in the art will appreciate the many possible applications and variations of the present disclosure based on the following illustrative embodiments of the present disclosure.

The appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

It will be understood that singular forms "a", "an" and "the" are intended to include the plural forms as well, unless the context clearly indicates otherwise. Furthermore, relative terms, such as "bottom" and "top," may be used herein to describe one element's relationship to other elements as illustrated in the Figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result.

In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Reference is now made to the drawings wherein like numerals refer to like parts throughout.

As used herein, the term "wireless" refers to wireless communication to a device or between multiple devices. Wireless devices may be anchored to a location and/or hardwired to a power system, depending on the needs of the business, venue, event or museum. In one embodiment, wireless devices may be enabled to connect to Internet, but do not need to transfer data to and from Internet in order to communicate within the wireless information communication and delivery system.

As used herein, the term "Smart Phone" or "smart phone" or "mobile device(s)" or "cellular phone" or "cellular" or "mobile phone" or the like refers to a wireless communication device, that includes, but is not limited to, an integrated circuit (IC), chip set, chip, system-on-a-chip including low noise amplifier, power amplifier, Application Specific Integrated Circuit (ASIC), digital integrated circuits, a transceiver, receiver, or transmitter, dynamic, static or non-transitory memory device(s), one or more computer processor(s) to process received and transmitted signals, for example, to and from the Internet, other wireless devices, and to provide communication within the wireless information communication and delivery system including send, broadcast, and receive information, signal data, location data, a bus line, an antenna to transmit and receive signals, and power supply such as a rechargeable battery or power storage unit. The chip or IC may be constructed ("fabricated") on a "die" cut from, for example, a Silicon, Sapphire, Indium Phosphide, or Gallium Arsenide wafer. The IC may be, for example, analogue or digital on a chip or hybrid combination thereof. Furthermore, digital integrated circuits may contain anything from one to thousands or millions of signal invertors, and logic gates, e.g., "AND", "OR", "NAND" and "NOR" gates, flipflops, multiplexors, etc., on a square area that occupies only a few millimeters. The small size of, for instance, IC's allows these circuits to provide high speed operation, low power dissipation, and reduced manufacturing cost compared with more complicated board-level integration.

As used herein, the terms "wireless", "wireless data transfer," "wireless tracking and location system," "positioning system" and "wireless positioning system" refer without limitation to any wireless system that transfers data or communicates or broadcasts a message, which communication may include location coordinates or other information using one or more devices, e.g., wireless communication devices.

As used herein, the terms "module" or "modules" refer without limitation to any software, software program(s), firmware, or actual hardware or combination thereof that has been added on, downloaded, updated, transferred or originally part of a larger computation or transceiver system that assists in or provides computational ability including, but not limited to, logic functionality to assist in or provide communication broadcasts of commands or messages, which communication may include location coordinates or communications between, among, or to one or more devices, e.g., wireless communication devices.

In some embodiments in accordance with the present disclosure, a non-transitory, i.e., non-volatile, computer readable storage medium is provided. The non-transitory computer readable storage medium is stored with one or more programs. When the program is executed by the processing unit of a computing device, i.e., that are part of a vehicle, the computing device is caused to conduct specific operations set forth below in accordance with some embodiments of the present disclosure.

Figure 8:
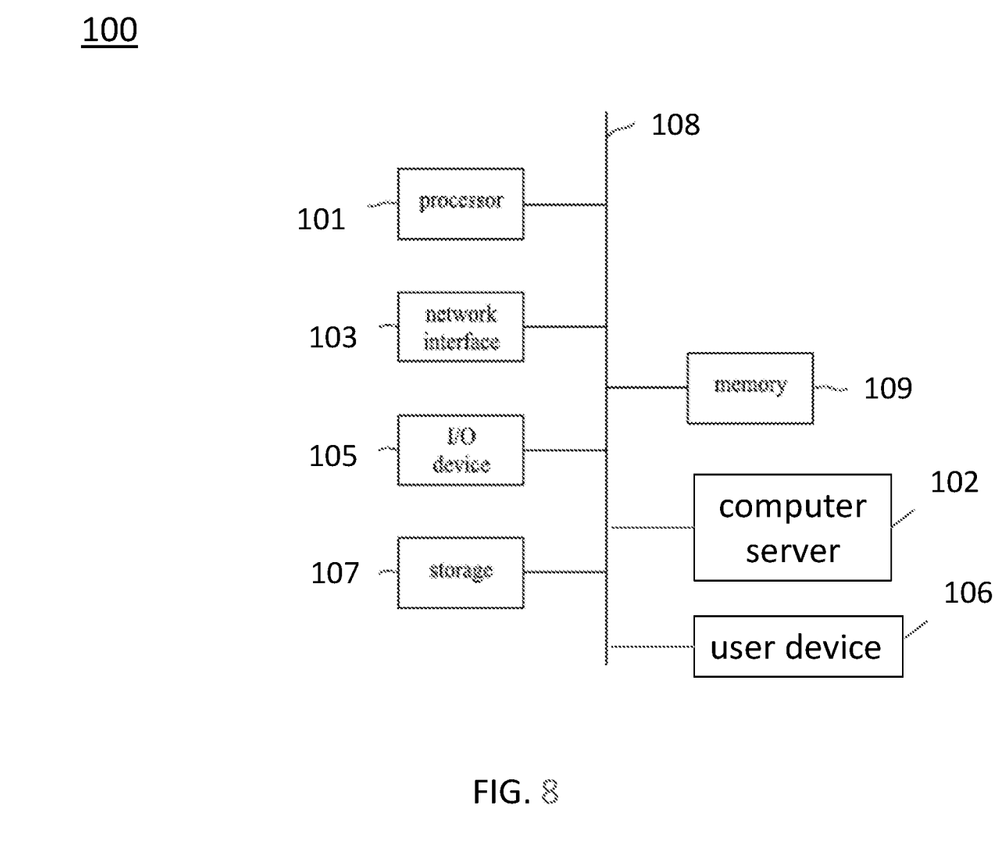
FIG. 8 is a schematic diagram of a system for LiDAR-based vehicle tracking, in accordance with another embodiment.

In some embodiments, as illustrated in FIG. 8, examples of non-transitory storage computer readable storage medium may include magnetic hard discs, optical discs, floppy discs, flash memories, or forms of electrically programmable memories (EPROM) or electrically erasable and programmable (EEPROM) memories. In certain embodiments, the term "non-transitory" may indicate that the storage medium is not embodied in a carrier wave or a propagated signal. In some embodiments, a non-transitory storage medium may store data that can, over time, change (e.g., in RAM or cache).

In some embodiments in accordance with the present disclosure, in operation, a client application is transmitted to the computing device upon a request of a user, for example, by a client device 106 (see FIG. 8). The client device 106 may be a smart phone downloading the application from a computer server 102. In operation, the application is installed at the vehicle. Accordingly, specific functions for vehicle tracking purposes may be executed by the user through a computing device.

Point cloud segmentation plays an important role in point cloud perception task, usually used in different kinds of algorithms including point cloud based object detection and tracking. Traditional LiDAR point cloud segmentation methods may often utilize exhaustive search, which requires a lot of computing power, or use approximation method, which does not yield fully correct result and needs further processing. The method according to the present disclosure utilizes data structure in Vehicle-borne LiDAR devices, and processes LiDAR scan as a circular image. As a result, as compared to traditional methods, a much faster segmentation can be achieved without sacrificing the correctness of the algorithm.

The LiDAR-based vehicle tracking faces mainly the following challenges: 1) only a small part of the vehicle can be observed in LiDAR point cloud data, especially if the vehicle is located far away from the ego-vehicle; 2) when occluded, the point cloud response belongs to a single vehicle can be fractured; and 3) the total processing power on a driver assistance system or autonomous vehicle can be limited.

In the present disclosure, a method for vehicle tracking is provided to generate vehicle tracklets (a time-space representation of a single vehicle) using LiDAR point cloud as input. The method uses a tracked vehicle representation from a previous frame to aid point cloud clustering in the current frame. Moreover, the method uses grouped clusters instead of raw LiDAR responses to accelerate computing.

Figure 1:
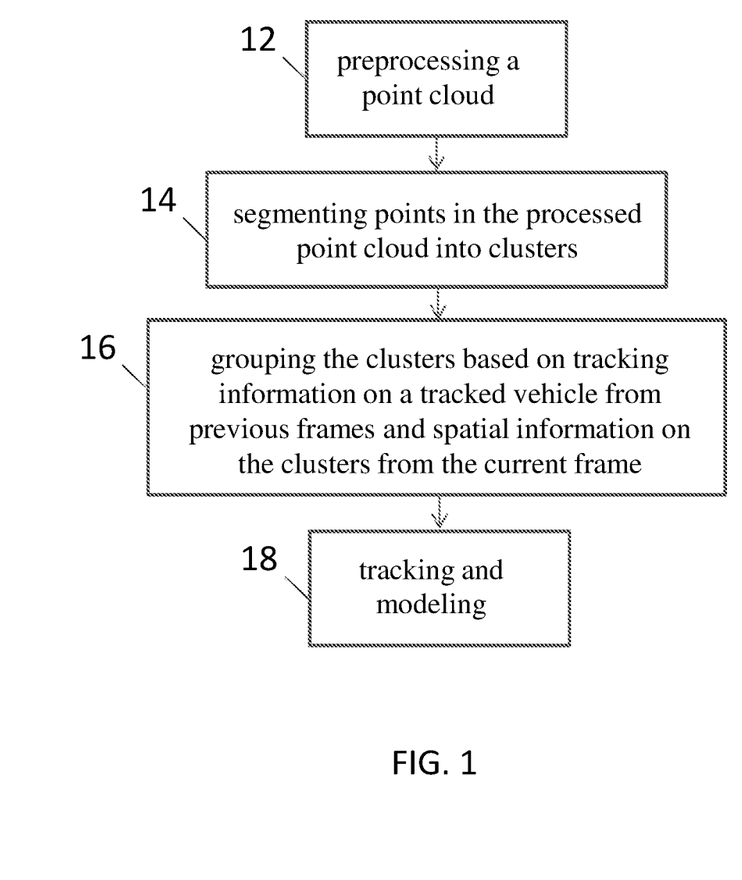
FIG. 1 is a flow diagram showing a method of LiDAR-based vehicle tracking, in accordance with some embodiments.

FIG. 1 is a flow diagram showing a method of LiDAR-based vehicle tracking, in accordance with some embodiments.

Referring to FIG. 1, the method includes point cloud pre-processing, segmentation, grouping, and assignment and tracking. In operation 12, a raw point cloud is obtained and then preprocessed to remove ground points. In operation 14, points in the processed point cloud are segmented into clusters. In operation 16, the clusters are grouped based on tracking information on a tracked vehicle from previous frames and spatial information on the clusters from the current frame. In operation 18, tracking and modeling for vehicle assignment is performed. The operations 12, 14, 16 and 18 are discussed in detail below by reference to FIGS. 2, 3A, 3B and 4 to 9.

Figure 2:
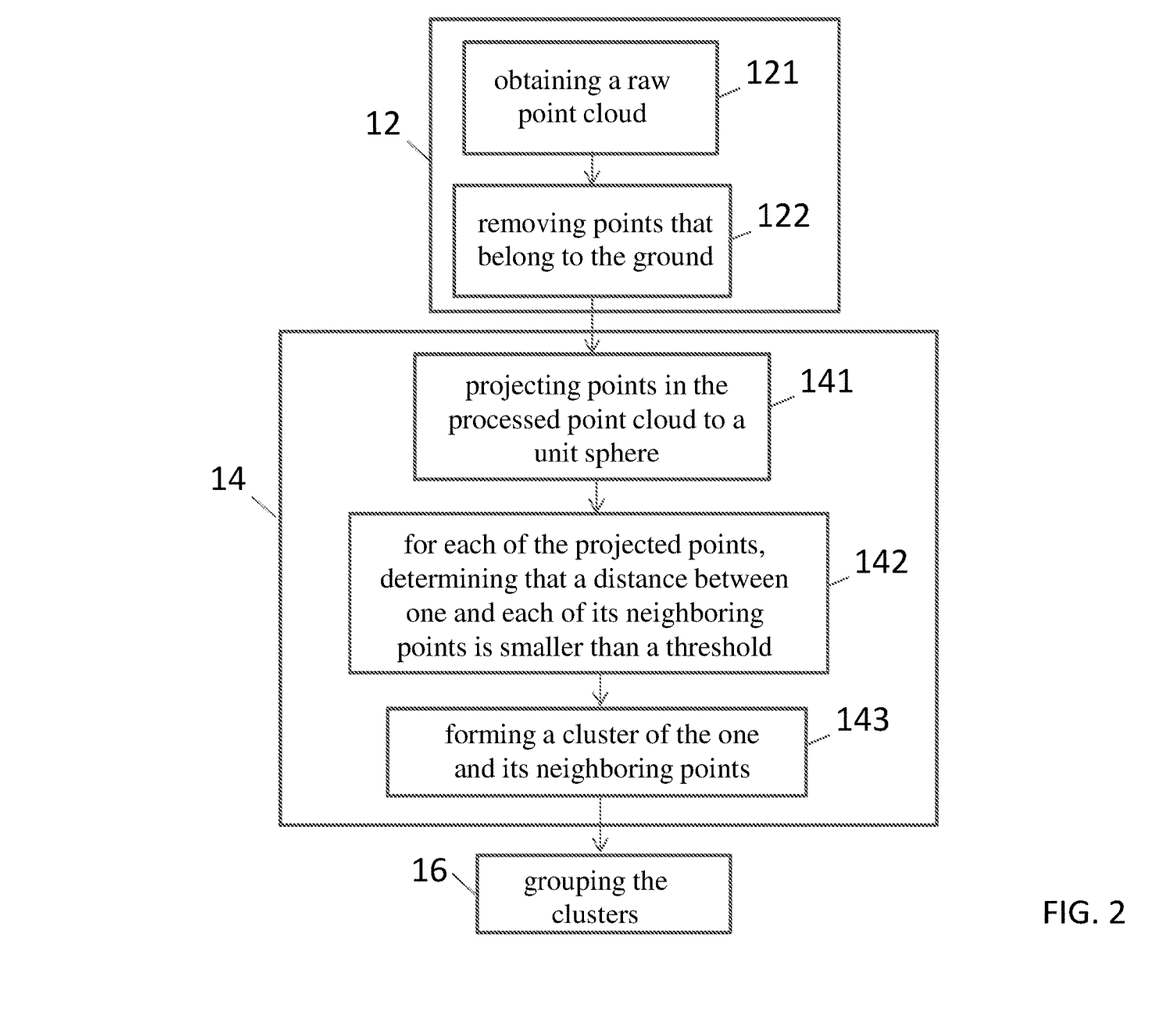
FIG. 2 is a flow diagram showing a method of segmenting points into clusters, in accordance with some embodiments.

FIG. 2 is a flow diagram showing a method of segmenting points into clusters, in accordance with some embodiments. In operation 12 illustrated in FIG. 1, a raw point cloud is obtained and then preprocessed to remove ground points.

Referring to FIG. 2, in operation 121, a raw point cloud is obtained from a LiDAR. The LiDAR may be mounted on the roof of a vehicle. LiDAR has become increasingly common in both industrial and robotic applications, and are particularly desirable for their direct distance measurements and high accuracy. In an embodiment according to the present disclosure, the LiDAR is equipped with many simultaneous rotating beams at varying angles, for example, a 64-beam rotating LiDAR. The multiple-beam LiDAR provides at least an order of magnitude more data than a single-beam LiDAR and enables new applications in mapping, object detection and recognition, scene understanding, and simultaneous localization and mapping (SLAM). LiDAR scans are collected in the form of a sweep in approximately 20 Hz to generate a three-dimensional (3D) point cloud of the surrounding environment. A sweep is defined as a scan coverage of the LiDAR sensor rotating from 0 degree to 360 degrees.

In operation 122, the raw point cloud obtained is then preprocessed by way of ground removal to remove ground points. As a result, points that belong to ground or road surface are removed.

After the processing of ground removal in operation 122, the remaining points will be clustered so that each point cluster may represent an object, that is, a vehicle on a road. In the present disclosure, a coarse segmentation followed by a fine segmentation is performed to efficiently segment the points.

In operation 141, points in the processed point cloud are projected to a unit sphere.

In operation 142, for each of the projected points, it is determined whether a distance between one and each of its neighboring points is smaller than a threshold. In an embodiment, each of all the projected points and its neighboring points are checked based on their Euclidean distance. The neighboring relationship between points is used to check if two points belong to a same segment. If the distance between two points neighboring on the cylindrical projection is smaller than the threshold, these points are considered as belonging to a single cluster. The segments information is computed by checking the distances between all neighboring point pairs. The threshold is selected to make sure no under-segmentation. Under-segmentation may result in points from more than one vehicles to be segmented into one cluster.

In operation 143, clusters of the projected points are formed. Consequently, the projected points are said to be "coarsely segmented" in to clusters, using the threshold. By only determining each point's nearest neighbors instead of all the points in an exhaustive search, the coarse segmentation can run much faster than the exhaustive search. Moreover, in the coarse segmentation, over-segmentation instead of under-segmentation is employed because a fine segmentation based on a grouping method in FIG. 3 will be followed to improve the coarse segmentation result.

Figure 3A:
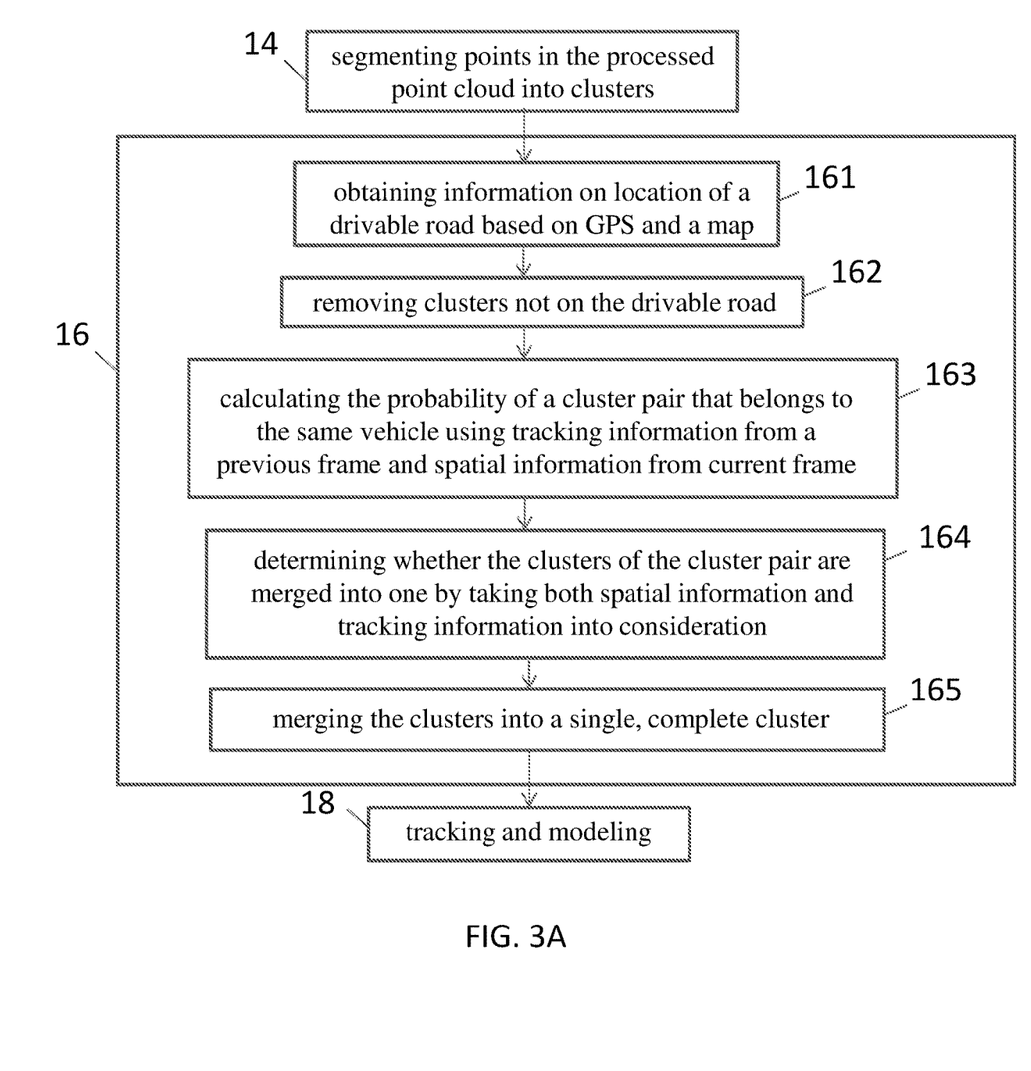
FIG. 3A is a flow diagram showing a method of grouping clusters, in accordance with some embodiments.

FIG. 3A is a flow diagram showing a method of grouping clusters, in accordance with some embodiments. In operation 16 illustrated in FIG. 1, the clusters are grouped based on spatial information on the clusters from the current frame and tracking information on a tracked vehicle from previous frames. The spatial information is related to a distance between one cluster and another cluster in bird eye view. The tracking information is related to a predetermined setting (such as position, shape and velocity) of one cluster, which is a tracked object, relative to another cluster.

Referring to FIG. 3A, in operation 161, information on location of a drivable road based on global positioning system (GPS) and a map is obtained. The information is provided by a GPS module and a mapping (MAP) module. The map is used to determine whether a cluster is considered to be a vehicle or a part of a vehicle. Clusters, if any, not on the drivable road are removed in operation 162.

In operation 163, the probability of a cluster pair that belongs to the same vehicle is calculated using tracking information from a previous frame and spatial information from current frame. In operation 164, it is determined whether the clusters of the cluster pair are merged into one by taking both spatial information and tracking information into consideration. Subsequently, in operation 165, clusters are merged into a single, complete cluster. Specifically, all the segment pairs are scanned through and the segments pairs that have a higher probability than a predefined threshold are merged. The merged segments are considered responses that belong to different vehicles.

Figure 3B:
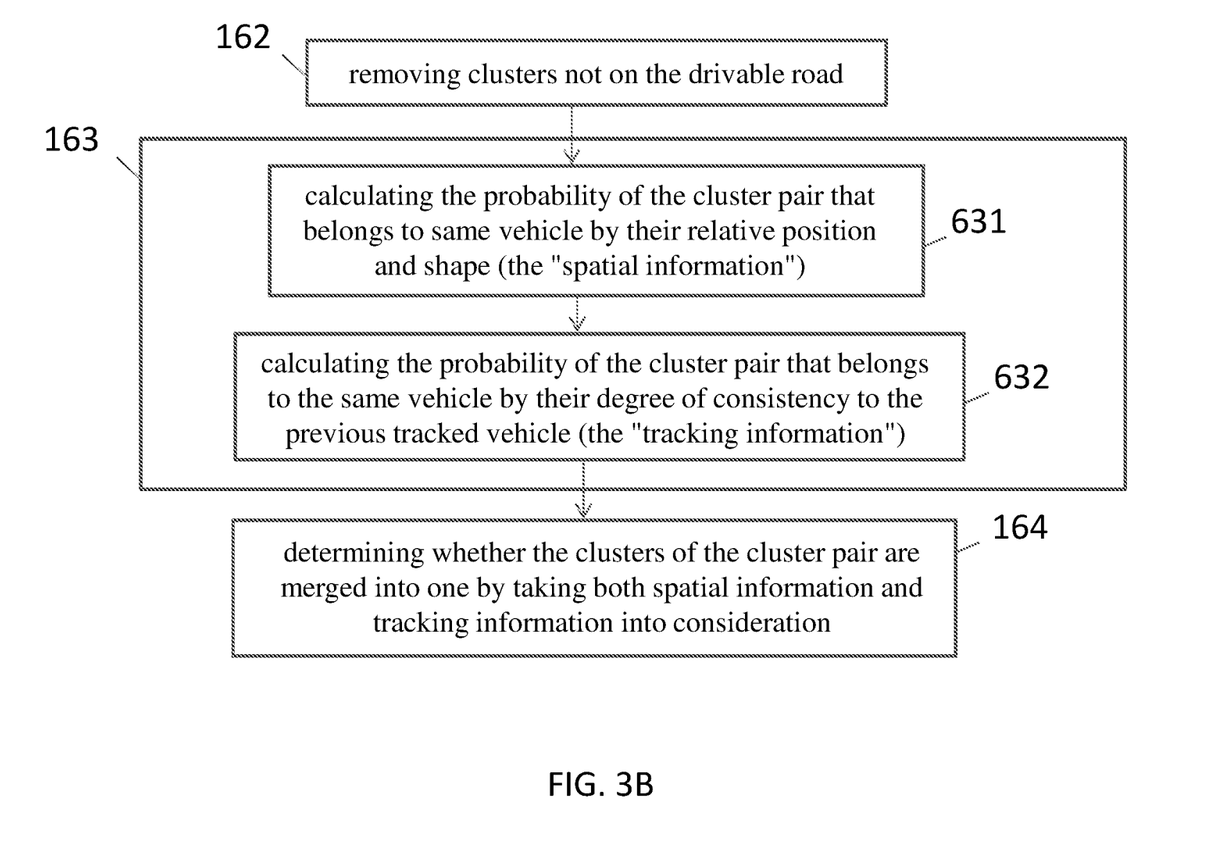
FIG. 3B is a flow diagram showing a method of calculating the probability of a cluster pair, in accordance with some embodiments.

FIG. 3B is a flow diagram showing a method of calculating the probability of a cluster pair that belongs to the same vehicle in operation 163 illustrated in FIG. 3A, in accordance with some embodiments. Referring to FIG. 3B, in operation 631, the probability of the cluster pair that belongs to same vehicle is calculated based on their relative position and shape (the "spatial information"). Further, in operation 632, the probability of the cluster pair that belongs to the same vehicle is calculated based on their degree of consistency to the previous tracked vehicle (the "tracking information"). Operations 631 and 632 are exchangeable in sequence.

Figure 4:
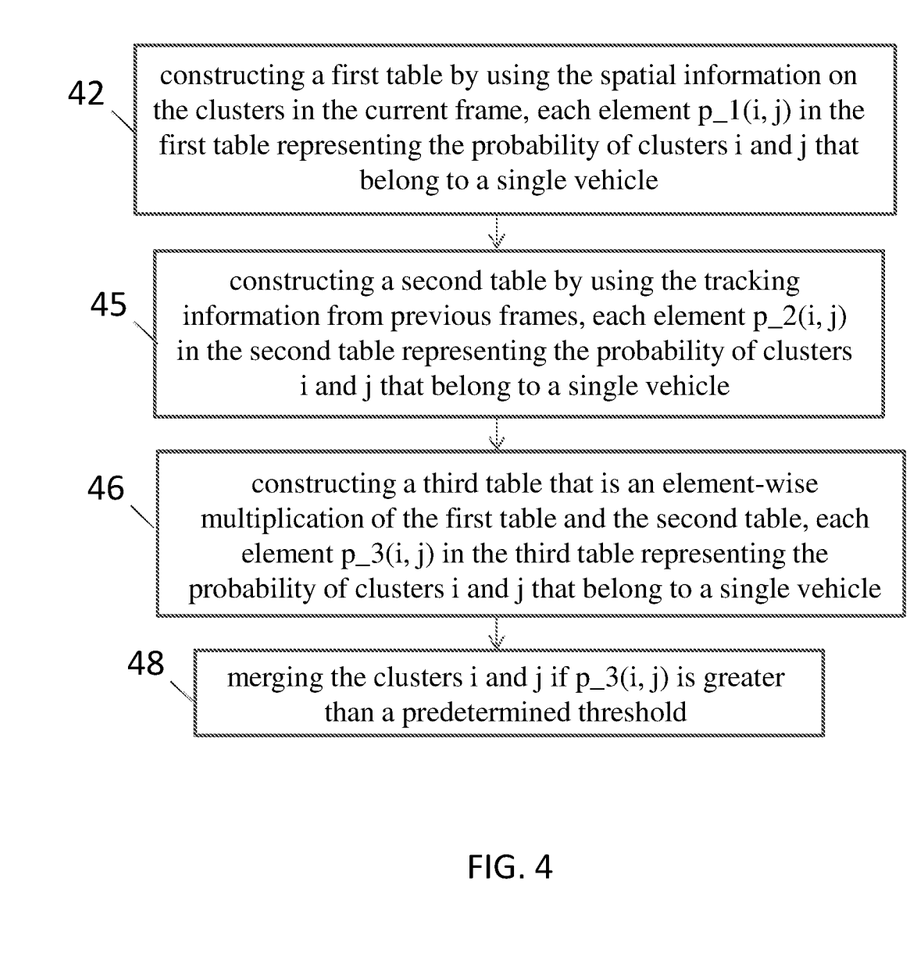
FIG. 4 is a flow diagram showing a method of merging clusters, in accordance with some embodiments.

FIG. 4 is a flow diagram showing a method of merging clusters, in accordance with some embodiments.

In operation 42, a first table is constructed by using the spatial information on the clusters in the current frame. Each element $p\_1(i, j)$ in the first table represents the first probability of clusters i and j that belong to a single vehicle.

In operation 45, a second table is constructed by using the tracking information from previous frames. Each element $p\_2(i, j)$ in the second table represents the second probability of clusters i and j that belong to a single vehicle.

In operation 46, a third table that is an element-wise multiplication of the first table and the second table is constructed. Each element $p\_3(i, j)$ in the third table represents the third probability of clusters i and j that belong to a single vehicle.

In operation 48, the clusters i and j are merged if the third probability $p\_3(i, j)$ is greater than a predetermined threshold.

Figure 5:
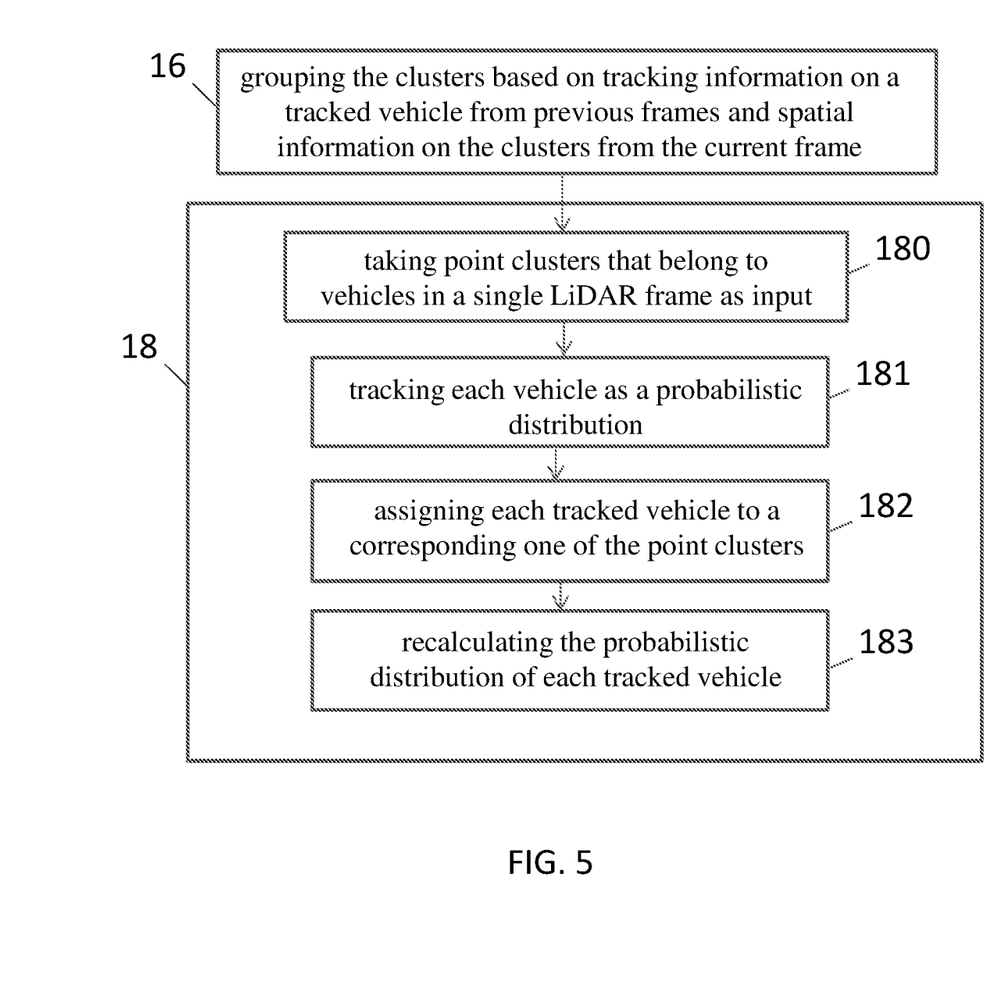
FIG. 5 is a flow diagram showing a method of tracking and modeling, in accordance with some embodiments.

FIG. 5 is a flow diagram showing a method of tracking and modeling, in accordance with some embodiments.

Referring to FIG. 5, in operation 180, point clusters that belong to vehicles in a single LiDAR frame are taken as input. Subsequently, in operation 181, each vehicle is tracked as a probabilistic distribution. A probabilistic distribution of each vehicle is determined by, for example, taking the vehicle attributes into consideration. The vehicle attributes may include but are not limited to velocity, shape or position of a vehicle, which can be described by a probability distribution. In an embodiment, the probability of a cluster that belongs to a tracked vehicle is calculated by comparing the cluster's attributes against a probability model of the tracked vehicle. The attributes of a cluster include but are not limited to position, appearance and dimension of the cluster. Then in operation 182, each tracked vehicle is assigned to a corresponding one of the point clusters based on probabilistic distribution. In an embodiment, vehicle assignment is determined by solving a linear assignment problem by using the calculated probability as weight to match a cluster with one of the tracked vehicles. Further, a post processing is performed for unmatched vehicles and clusters by, for example, registering a new vehicle to track and removing a tracked vehicle from the tracked list. Subsequently, in operation 183, the probabilistic distribution of each tracked vehicle is recalculated based on the assigned cluster. Further, a result of the recalculation is in operation 182 in assigning a tracked vehicle to a cluster.

Figure 6:
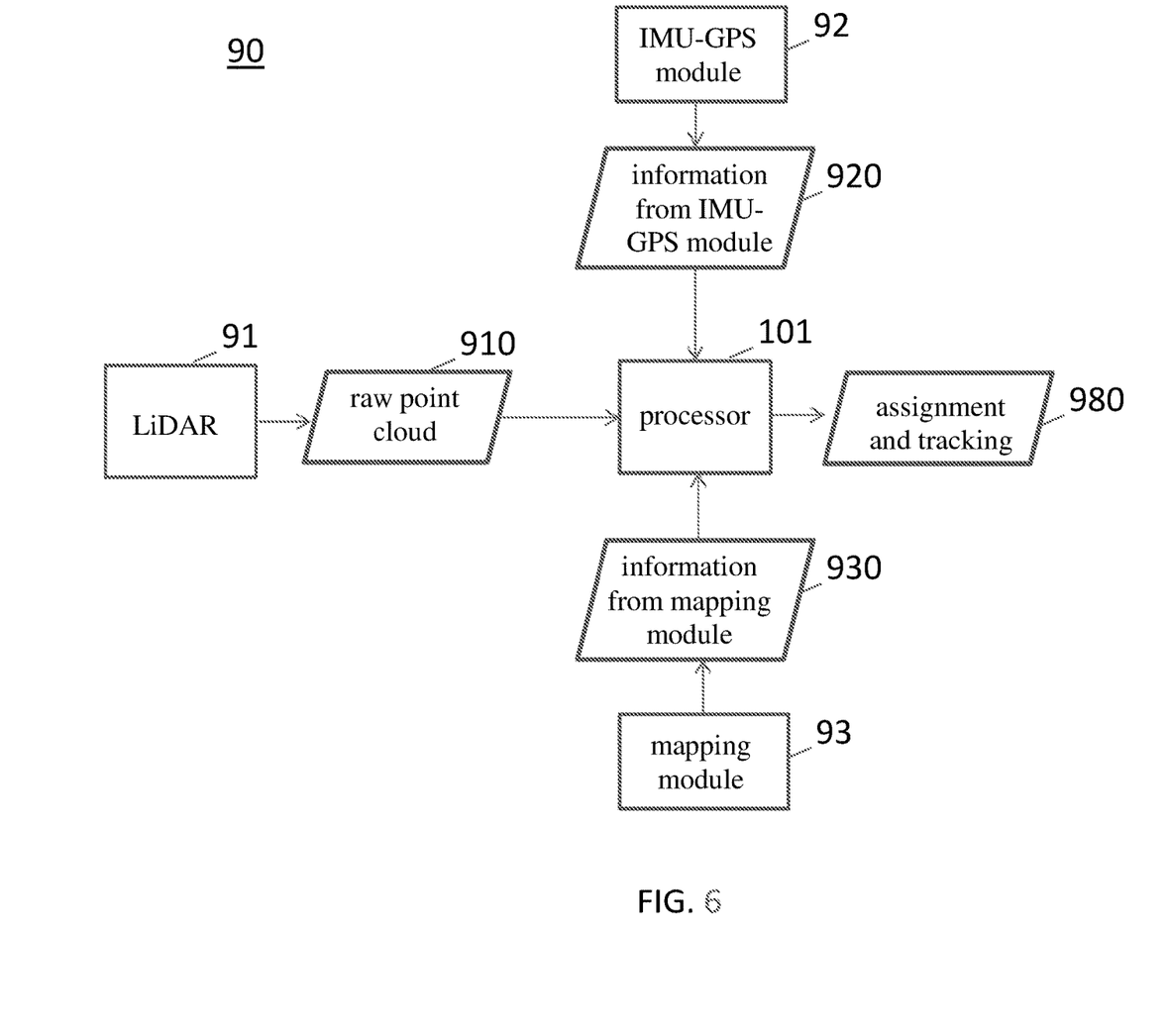
FIG. 6 is a schematic diagram of a system for LiDAR-based vehicle tracking, in accordance with an embodiment.

FIG. 6 is a schematic diagram of a system 90 for LiDAR-based vehicle tracking, in accordance with an embodiment.

Referring to FIG. 6, the system 90 includes a processor 101, a LiDAR 91, an inertial measurement unit (IMU) and global positioning system (GPS) module 92, and a mapping (MAP) module 93. The LiDAR 91, IMU-GPS module 92 and MAP module 93 collect data in an environment. The LiDAR 91 provides a raw point cloud 910 to the processor 101. The IMU-GPS module 92 provides to the processor 101 information 920 on at least one of a vehicle pose, vehicle speed, geolocation and time. The MAP module 93 is configured to create a map 930 of its surroundings, and orient a vehicle itself within this map. The processor 101 is configured to execute program instructions that include a tool module configured to perform methods as described and illustrated with reference to FIGS. 1, 2, 3A, 3B, 4 and 5.

Figure 7:
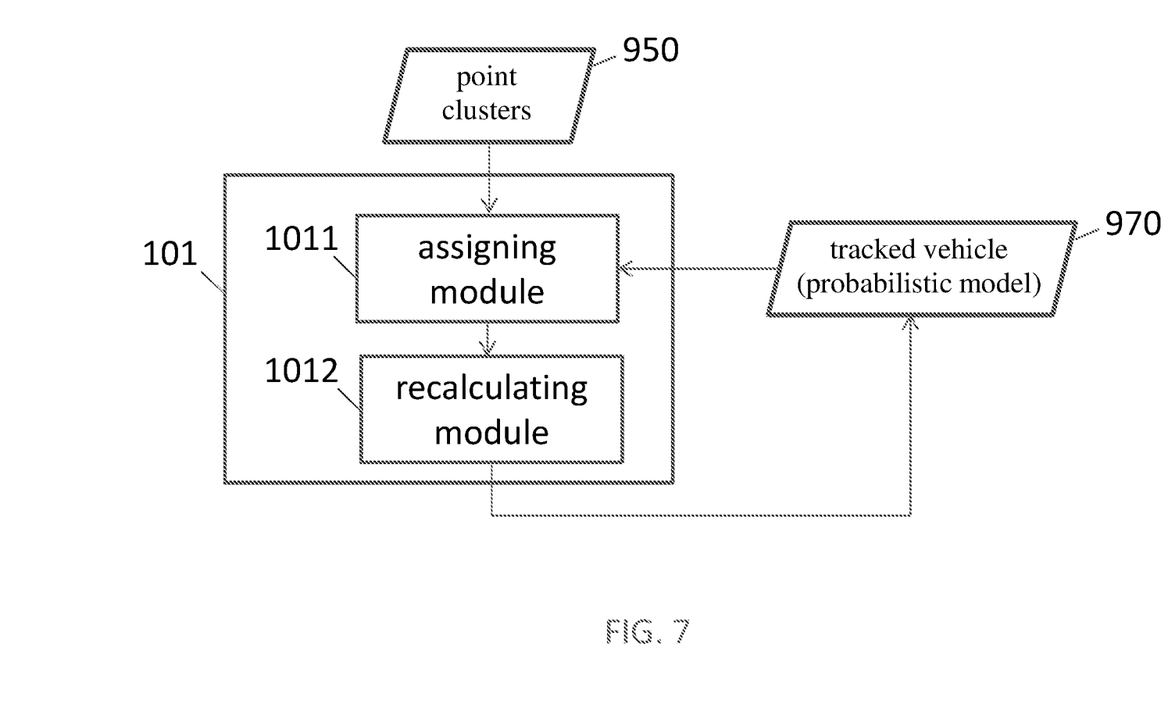
FIG. 7 is a block diagram of a processor illustrated in FIG. 6, in accordance with some embodiments.

FIG. 7 is a block diagram of the processor 101 illustrated in FIG. 6, in accordance with some embodiments.

Referring to FIG. 7, the processor 101 includes an assigning module 1011 and a recalculating module 1012. The assigning module 1012 is configured to, based on probabilistic distribution, assign each vehicle to a corresponding one of the point clusters. The recalculating module 1013 is configured to, based on the assigned cluster, recalculate the probabilistic distribution. Moreover, a result of the recalculation in the form of a probabilistic model 970 is sent to the assigning module 1012 to facilitate vehicle assignment.

FIG. 8 is a schematic diagram of a system 100 for LiDAR-based vehicle tracking, in accordance with another embodiment.

Referring to FIG. 8, the system 100 includes, in addition to the processor 101 described and illustrated with reference to FIG. 6, a computer server 102, a network interface 103, an input and output (I/O) device 105, a storage device 107, a memory 109, and a bus or network 108. The bus 108 couples the network interface 103, the I/O device 105, the storage device 107 and the memory 109 to the processor 101.

Accordingly, the processor 101 is configured to enable the computer server 102, e.g., Internet server, to perform specific operations disclosed herein. It is to be noted that the operations and techniques described herein may be implemented, at least in part, in hardware, software, firmware, or any combination thereof. For example, various aspects of the described embodiments, e.g., the processor 101, the computer server 102, or the like, may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components.

The term "processing unit" or "processing circuitry" may generally refer to any of the foregoing logic circuitry, alone or in combination with other logic circuitry, or any other equivalent circuitry. A control unit including hardware may also perform one or more of the techniques of the present disclosure.

In some embodiments in accordance with the present disclosure, the computer server 102 is configured to utilize the I/O port 105 to communicate with external devices via a network 108, such as a wireless network. In certain embodiments, the I/O port 105 is a network interface component, such as an Ethernet card, an optical transceiver, a radio frequency transceiver, or any other type of device that can send and receive data from the Internet. Examples of network interfaces may include Bluetooth®, 3G and WiFi® radios in mobile computing devices as well as USB. Examples of wireless networks may include WiFi®, Bluetooth®, and 3G. In some embodiments, the internet server 102 is configured to utilize the I/O port 105 to wirelessly communicate with a client device 106, such as a mobile phone, a tablet PC, a portable laptop or any other computing device with internet connectivity. Accordingly, electrical signals are transmitted between the computer server 102 and the client device 106.

In some embodiments in accordance with the present disclosure, the computer server 102 is a virtual server capable of performing any function a regular server has. In certain embodiments, the computer server 102 is another client device of the system 100. In other words, there may not be a centralized host for the system 100, and the client devices 106 in the system are configured to communicate with each other directly. In certain embodiments, such client devices 106 communicate with each other on a peer-to-peer (P2P) basis.

The network interface 103 is configured to access program instructions and data accessed by the program instructions stored remotely through a network (not shown).

The I/O device 105 includes an input device and an output device configured for enabling user interaction with the system 100. In some embodiments, the input device comprises, for example, a keyboard, a mouse, and other devices. Moreover, the output device comprises, for example, a display, a printer, and other devices.

The storage device 107 is configured for storing program instructions and data accessed by the program instructions. In some embodiments, the storage device 107 comprises, for example, a magnetic disk and an optical disk.

The memory 109 is configured to store program instructions to be executed by the processor 101 and data accessed by the program instructions. In some embodiments, the memory 109 comprises a random access memory (RAM) and/or some other volatile storage device and/or read only memory (ROM) and/or some other non-volatile storage device including other programmable read only memory (PROM), erasable programmable read only memory (EPROM), electronically erasable programmable read only memory (EEPROM), flash memory, a hard disk, a solid state drive (SSD), a compact disc ROM (CD-ROM), a floppy disk, a cassette, magnetic media, optical media, or other computer readable media. In certain embodiments, the memory 109 is incorporated into the processor 101.

Thus, specific embodiments and applications have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment.

What is claimed is:

1. A method of Lidar-based vehicle tracking, comprising:
    calculating a probability that clusters of a cluster pair belong to a same vehicle using tracking information from previous frames and spatial information from a current frame, wherein each cluster in the cluster pair represents point cloud obtained using a LIDAR;
    determining that the clusters of the cluster pair are to be merged by taking both the spatial information from the current frame and the tracking information from the previous frames into consideration; and
    merging, based on the determining, the clusters of the cluster pair together.

2. The method according to claim 1, wherein
    the spatial information from the current frame comprises at least one of a relative position or a shape of the clusters of the cluster pair.

3. The method according to claim 1, wherein
    the probability is calculated using a degree of consistency of the clusters of the cluster pair with the tracking information from the previous frames.

4. The method according to claim 1, comprising:
obtaining information on location of a drivable road using a global positioning system (GPS) and a map; and
removing clusters that are not on the drivable road.

5. The method according to claim 1, comprising:
segmenting points in the point cloud into clusters using a two-step process in which a coarse segmentation is first performed followed by a fine segmentation.

6. The method according to claim 5 comprising:
calculating the probability for all the cluster pairs in the clusters, wherein
the merging is done only for cluster pairs for which the probability is higher than a predetermined threshold.

7. A system for Lidar-based vehicle tracking, comprising:
a server, comprising: an I/O port configured to transmit and receive electrical signals to and from a client device, a memory, and one or more processing units; and
one or more programs stored in the memory and configured for execution by the one or more processing units, wherein the one or more programs include instructions for:
calculating a probability that clusters of a cluster pair belong to a same vehicle using tracking information from previous frames and spatial information from a current frame, wherein each cluster in the cluster pair represents points of a point cloud obtained using a LIDAR;
determining that the clusters of the cluster pair are to be merged by taking both the spatial information from the current frame and the tracking information from the previous frames into consideration; and
merging, based on the determining, the clusters of the cluster pair together.

8. The system according to claim 7, wherein
the spatial information from the current frame comprises at least one of a relative position or a shape of the clusters of the cluster pair.

9. The system according to claim 7, wherein
the probability is calculated using a degree of consistency of the clusters of the cluster pair with the tracking information from the previous frames.

10. The system according to claim 7, wherein
the one more programs include instructions for obtaining information on location of a drivable road using a global positioning system (GPS) and a map, and removing clusters that are not on the drivable road.

11. A non-transitory computer-readable program medium storing a program comprising instructions, when implemented by a computing device, causing the computing device to implement a method of LIDAR-based vehicle tracking, comprising:
obtaining a point cloud using a LIDAR;
segmenting points in the point cloud into clusters; and
calculating a probability that clusters of a cluster pair from the clusters belong to a same vehicle using a first probability calculated using tracking information for one or more vehicles obtained from one or more previous frames and a second probability calculated using spatial information for the clusters of the cluster pair obtained from a current frame.

12. The non-transitory computer-readable program medium according to claim 11, wherein the probability is calculated as a product of the first probability and the second probability.

13. The non-transitory computer-readable program medium according to claim 11, wherein the instructions cause the computing device to further implement:
calculating the probability for all cluster pairs in the clusters; and
merging clusters in the cluster pairs for which the probability is higher than a predetermined threshold together to result in one or more complete clusters.

14. The non-transitory computer-readable program medium according to claim 13, wherein the instructions cause the computing device to further implement:
assigning a tracked vehicle to one of the complete clusters or determining that the tracked vehicle cannot be assigned to any of the complete clusters.

15. The non-transitory computer-readable program medium according to claim 14, wherein the tracked vehicle is tracked as a probabilistic distribution.

16. The non-transitory computer-readable program medium according to claim 15, wherein the probabilistic distribution is determined using at least one of velocity, shape, or position attribute of the tracked vehicle, wherein the attribute is described by a probability distribution.

17. The non-transitory computer-readable program medium according to claim 16, wherein assigning the tracked vehicle to one of the complete clusters or determining that the tracked vehicle cannot be assigned to any of the complete clusters is performed using comparing attributes of a complete cluster against the probabilistic distribution.

18. The non-transitory computer-readable program medium according to claim 14, wherein assigning the tracked vehicle to one of the complete clusters or determining that the tracked vehicle cannot be assigned to any of the complete clusters is performed using comparing attributes of a complete cluster against a probability model of the tracked vehicle.

19. The non-transitory computer-readable program medium according to claim 11, wherein the instructions cause the computing device to further implement:
determining that the clusters of the cluster pair are to be merged by taking both the spatial information for the clusters of the cluster pair obtained from the current frame and the tracking information for the one or more vehicles obtained from the one or more previous frames into consideration.

20. The non-transitory computer-readable program medium according to claim 19, wherein the instructions cause the computing device to further implement:
merging, based on the determining, the clusters of the cluster pair together.

* * * * *

UNITED STATES PATENT AND TRADEMARK OFFICE
CERTIFICATE OF CORRECTION

| | |
|---|---|
| PATENT NO. | : 10,878,580 B2 |
| APPLICATION NO. | : 16/160761 |
| DATED | : December 29, 2020 |
| INVENTOR(S) | : Xue Mei and Chenyang Li |

It is certified that error appears in the above-identified patent and that said Letters Patent is hereby corrected as shown below:

In the Claims

In Column 10, Line 53, in Claim 1, delete "represents" and insert -- represents points of a --, therefor.

In Column 11, Line 44, in Claim 10, delete "one more" and insert -- one or more --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*